US006734650B2

United States Patent
Abel (10) Patent No.: US 6,734,650 B2
(45) Date of Patent: May 11, 2004

(54) SYSTEM AND METHOD FOR CONTROLLING AN ACTIVE MAGNETIC BEARING USING CONTINUOUS VARIABLE COMPENSATION

(75) Inventor: Stephen G. Abel, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 288 days.

(21) Appl. No.: 10/060,184

(22) Filed: Jan. 30, 2002

(65) Prior Publication Data

US 2003/0141772 A1 Jul. 31, 2003

(51) Int. Cl.[7] .................. G05B 5/01; G05D 23/275; H02K 7/09
(52) U.S. Cl. .................. 318/623; 318/632; 318/611; 310/90.5
(58) Field of Search ................. 318/623, 632, 318/611, 620, 652, 610; 310/90, 90.5; 324/207.12, 207.24; 361/146

(56) References Cited

U.S. PATENT DOCUMENTS

| 4,121,143 | A | | 10/1978 | Habermann et al. | |
|---|---|---|---|---|---|
| 4,686,404 | A | * | 8/1987 | Nakazeki et al. | 310/90.5 |
| 4,841,184 | A | | 6/1989 | Chen et al. | |
| 4,879,500 | A | | 11/1989 | Kanemitsu | |
| 4,885,491 | A | | 12/1989 | Hiyama et al. | |
| 5,013,987 | A | | 5/1991 | Wakui | |
| 5,155,402 | A | | 10/1992 | Bichler | |
| 5,247,219 | A | | 9/1993 | Nakagawa et al. | |
| 5,351,934 | A | | 10/1994 | Jensen et al. | |
| 5,720,010 | A | * | 2/1998 | Watanabe et al. | 700/258 |
| 5,736,802 | A | * | 4/1998 | Ueyama et al. | 310/90.5 |
| 5,925,957 | A | * | 7/1999 | Chapman | 310/90.5 |
| 5,973,468 | A | | 10/1999 | Yamauchi | |
| 6,020,665 | A | * | 2/2000 | Maurio et al. | 310/90.5 |
| 6,191,513 | B1 | | 2/2001 | Chen et al. | |
| 6,215,218 | B1 | | 4/2001 | Ueyama | |
| 6,267,876 | B1 | | 7/2001 | Allaire et al. | |

FOREIGN PATENT DOCUMENTS

| JP | 63308215 A | * | 12/1988 | ........... F16C/32/04 |
|---|---|---|---|---|
| JP | 04057109 A | * | 2/1992 | ............ G05D/3/12 |
| JP | 10220475 | | 8/1998 | |
| WO | WO 00/07280 | | 2/2000 | |

OTHER PUBLICATIONS

Proceedings of the American Control Conference: A New Learning Control Approach to the Active Magnetic Bearing Benchmark System; p. 2639–2643; B.T. Costic, et al; Chicago, IL; Jun. 2000.

Proceedings of the American Control Conference: Nonlinear Control of Magnetic Bearing in the Presence of Sinusoidal Disturbance; p. 3636–3641; A. Behal, et al; Arlington, VA; Jun. 25–27, 2001.

* cited by examiner

Primary Examiner—Rina Duda
Assistant Examiner—Edgardo San Martin
(74) Attorney, Agent, or Firm—Dougas A. Mullen, Esq.

(57) ABSTRACT

A system and method for controlling an active magnetic bearing assembly by varying the system control laws in a continuous non-linear fashion as a function of rotor rotational speed. The system control law variation is carried out in a continuous and optimal manner over the operating speed range of the rotor, and is not computationally intensive.

59 Claims, 7 Drawing Sheets

SYSTEM AND METHOD FOR CONTROLLING AN ACTIVE MAGNETIC BEARING USING CONTINUOUS VARIABLE COMPENSATION

BACKGROUND OF THE INVENTION

The present invention relates to magnetic bearings and, more particularly, to a system and method for controlling an active magnetic bearing system for use in various applications, including satellites and other space applications. The magnetic bearing system is controlled using a combination of modal transformations and steady-state gains that vary continuously and non-linearly with the rotational speed of the rotor being supported by the magnetic bearing system.

Magnetic bearings have been used to suspend a rotational body, such as a rotor, with magnetic force in a non-contact fashion. That is, instead of physically supporting the rotor using lubricated bearings that physically contact the rotor, various magnets are spaced radially around the rotor and their magnetic forces suspend the rotor without any physical contact. In order to provide stable support for the rotor, the magnetic bearing suspends the rotor within five degrees-of-freedom.

Generally, there are two categories of magnetic bearings, passive magnetic bearings and active magnetic bearings. Passive magnetic bearings are the simplest type, and use permanent magnets or fixed strength electromagnets to support the rotor. Thus, the properties of the bearing, such as the magnetic field strength, may not be controlled during operation. Conversely, active magnetic bearings are configured such that the magnetic field strength of the bearing is controllable during operation. To accomplish this, at least one active magnetic bearing channel may be provided for each degree-of-freedom of the shaft. An active magnetic bearing channel may include a position sensor, a controller operating according to a predetermined control law, and an electromagnetic actuator. In general, the position sensor senses the position of the shaft and supplies a signal representative of its position to the controller. The controller, in accordance with the predetermined control law, then supplies the appropriate current magnitude to the electromagnetic actuator, which in turn generates an attractive magnetic force to correct the position of the shaft.

The control law in an active magnetic bearing system channel may be implemented using a multi-order filter. In order to provide stable, high response control of the rotor, the filter characteristics may need to vary as the rotational speed of the rotor varies. This may be the case if the rotor experiences gyroscopic effects, which increases with rotational speed. One method of varying filter characteristics is through the use of gain scheduling, in which various filters are switched in and out of operation at predetermined rotational speed setpoints. With gain scheduling, the various filters operate optimally at the middle of their predetermined speed ranges, are off-design near the boundaries, and transition through a discontinuity at the switch points. Another method of varying filter characteristics is to implement a continuous, linear gain change of one or more filters as a function of speed. This method provides stable control, but is less than optimal over the entire operating speed range of the rotor. Yet another method of varying filter characteristics is to change all of the coefficients of the filters in each channel as a continuous function of speed. This method, however, is computationally intensive.

Hence, there is a need for a system and method for controlling an active magnetic bearing that addresses one or more of the above-noted drawbacks. Namely, a system and method of control that is continuous over the operating speed range of the rotor, and/or is optimal over the operating speed range, and/or is not computationally intensive.

SUMMARY OF THE INVENTION

The present invention provides system and method for controlling an active magnetic bearing assembly by varying the system control laws in a continuous non-linear fashion as a function of rotor rotational speed.

In one embodiment of the present invention, and by way of example only, an active magnetic bearing system for rotationally suspending a rotor having a center of gravity includes at least two displacement sensors, a rotational speed sensor, a controller, and at least two electromagnetic actuators. Each displacement sensor is operable to sense rotor displacements in a sensor frame of reference that is displaced from the rotor center of gravity and supply displacement signals representative thereof. The rotational speed sensor is operable to sense a rotational speed of the rotor and supply a rotational speed signal. The controller is coupled to receive the displacement signals from each of the displacement sensors and the rotational speed signal from the rotational speed sensor. The controller, in response to the received signals, is operable to transform the displacement signals from the sensor frame of reference to a center of gravity frame of reference, generate correction signals according to predetermined gains to eliminate first and second linear displacements of the rotor's center of gravity and first and second rotational displacements around the rotor's center of gravity, vary the predetermined gains of at least the correction signals generated to eliminate the rotational displacements in a continuous non-linear fashion based on the received rotational speed signal, and transform the correction signals to an actuator frame of reference that is displaced from the rotor center of gravity. Each electromagnetic actuator is coupled to receive the transformed correction signals and is operable, in response thereto, to eliminate the sensed rotor displacements.

In another embodiment of the present invention, in a system including at least a rotor having a center of gravity, and an active magnetic bearing system having a plurality of displacement sensors each sensing rotor displacements according to sensor coordinates, and a plurality of actuators each operable to eliminate the rotor displacements according to actuator coordinates, the sensor and actuator coordinates each having a frame of reference displaced from the rotor center of gravity, a method of controlling the active magnetic bearing system to substantially eliminate the rotor displacements includes the step of transforming the sensed rotor displacements from the sensor coordinates to center of gravity coordinates, the center of gravity coordinates having the rotor's center of gravity as a frame of reference and including at least first and second linear displacements of the rotor center of gravity and first and second rotational displacements of the rotor around the rotor center of gravity. Correction signals are generated according to predetermined gains to eliminate the first and second linear displacements and the first and second rotational displacements. The predetermined gains of the first and second rotational displacement correction signals are continuously varied in a non-linear fashion based on a determined rotational speed of the rotor. The generated correction signals are transformed from the center of gravity coordinates to the actuator coordinates. The sensed rotor displacements are then eliminated using the transformed correction signals.

In yet another embodiment of the present invention, a method of generating control signals for controlling an active magnetic bearing system to substantially eliminate lateral displacement of a rotor center of gravity from a predetermined position and a rotation of the rotor around the center of gravity, includes transforming sensed rotor displacements from sensor coordinates having a frame of reference displaced from the rotor center of gravity to center of gravity coordinates having the rotor center of gravity as a frame of reference, the center of gravity coordinates including at least first and second linear displacements of the rotor center of gravity and first and second rotational displacements of the rotor around the rotor center of gravity. Correction signals are generated according to predetermined gains for eliminating the first and second linear displacements and first and second rotational displacements. The predetermined gains of the first and second rotational correction signals are varied in a continuous non-linear fashion based on a determined rotational speed of the rotor.

In still a further embodiment of the present invention, a satellite includes a housing, a component within the housing having a rotor with a center of gravity, and an active magnetic bearing system for rotationally suspending the rotor. The active magnetic bearing system includes at least two displacement sensors, a rotational speed sensor, a controller, and at least two electromagnetic actuators. Each displacement sensor is operable to sense rotor displacements in a sensor frame of reference that is displaced from the rotor center of gravity and supply displacement signals representative thereof. The rotational speed sensor is operable to sense a rotational speed of the rotor and supply a rotational speed signal. The controller is coupled to receive the displacement signals from each of the displacement sensors and the rotational speed signal from the rotational speed sensor. The controller, in response to the received signals, is operable to transform the displacement signals from the sensor frame of reference to a center of gravity frame of reference, generate correction signals according to predetermined gains to eliminate first and second linear displacements of the rotor's center of gravity and first and second rotational displacements around the rotor's center of gravity, vary the predetermined gains of at least the correction signals generated to eliminate the rotational displacements in a continuous non-linear fashion based on the received rotational speed signal, and transform the correction signals to an actuator frame of reference that is displaced from the rotor center of gravity. Each electromagnetic actuator is coupled to receive the transformed correction signals and is operable, in response thereto, to eliminate the sensed rotor displacements.

Other independent features and advantages of the preferred sensor will become apparent from the following detailed description, taken in conjunction with the accompanying drawings which illustrate, by way of example, the principles of the invention.

DETAILED DESCRIPTION OF VARIOUS EMBODIMENTS

Before proceeding with the detailed description of the invention, it is to be appreciated that the magnetic bearing system of the present invention is not limited to use with a particular configuration. Thus, although the magnetic bearing system that is explicitly depicted and described is a system that is implemented using independent radial and axial bearing assemblies, it will be appreciated that other magnetic bearing configurations may also be used with the control system and method of the present invention. For example, the control system and method may also be used with a combination bearing configuration, or a conical bearing configuration.

Figure 1:
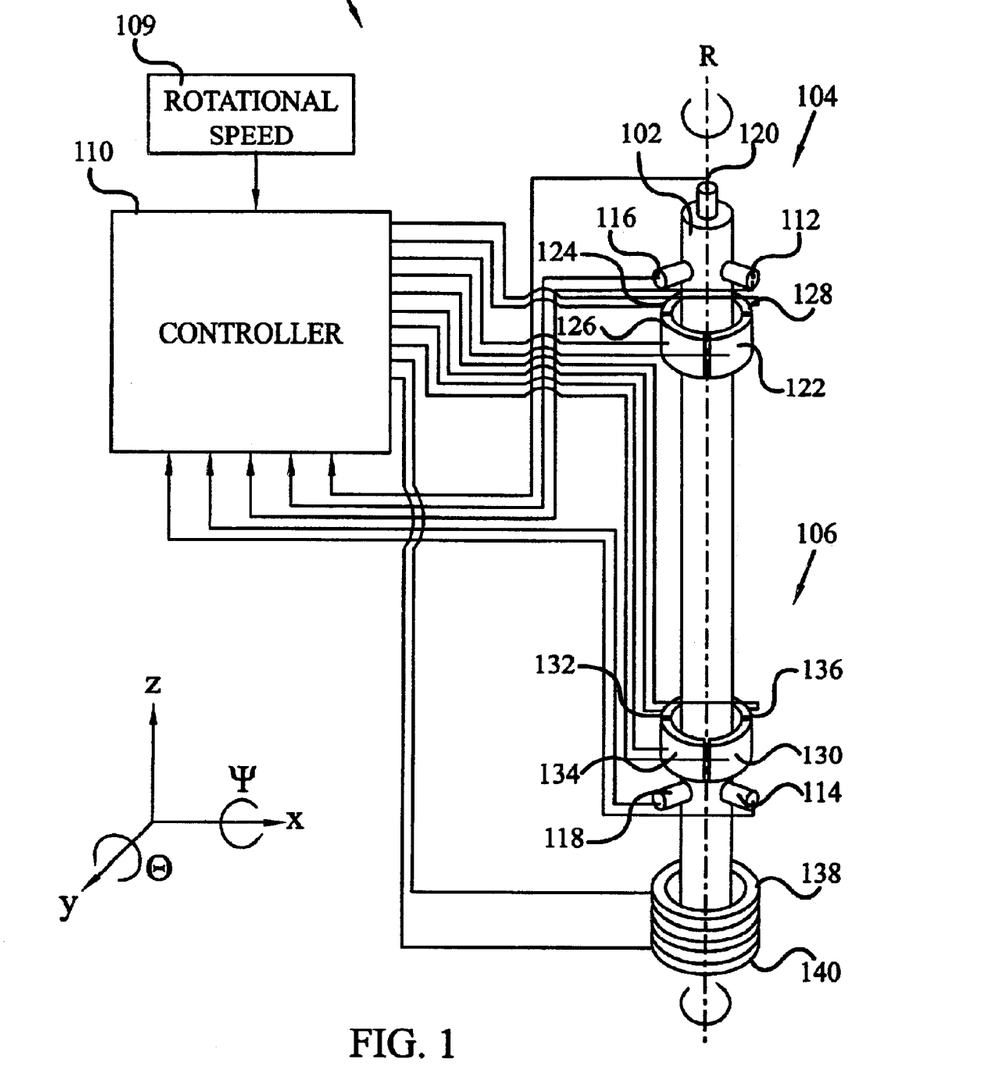
FIG. 1 is a perspective view of an active magnetic bearing system that may utilize an embodiment of the present invention.

Turning now to the description, a perspective view of an active magnetic bearing system 100 that may utilize the present invention is depicted in FIG. 1. The system 100 includes a rotationally mounted rotor 102, two radial magnetic bearing assemblies 104 and 106, an axial magnetic bearing assembly 108, a rotational speed sensor 109, and a controller 110. The rotor 102, which has a center of gravity G and an axis of rotation R, is suspended by the magnetic bearing assemblies 104, 106, 108 and moves according to five degrees-of-freedom. These five degrees-of-freedom, as depicted in FIG. 1, include three lateral axes (X, Y, Z) and two rotational axes (theta ($\theta$), psi ($\Psi$)).

The magnetic bearing assemblies 104, 106 and 108 each include one or more displacement sensors and electromagnetic actuators to sense and eliminate rotor displacements, respectively, to thereby control the position of the rotor 102 within the five degrees-of-freedom. Specifically, a first set of displacement sensors 112 and 114 sense rotor displacements in the x-axis, a second set of displacement sensors 116 and 118 sense rotor displacements in the y-axis, and another displacement sensor 120 senses rotor displacements in the z-axis. The displacement sensors 112–120 each supply displacement signals to the controller 110. The controller 110 processes the displacement signals and, in turn, supplies correction signals to electromagnet actuators 122–140 to eliminate the sensed displacements. In particular, electromagnetic actuators 122–128 are used to eliminate rotor displacements in the x-axis and the $\Psi$-axis, electromagnetic actuators 130–136 are used to eliminate rotor displacements in the y-axis and the $\theta$-axis, and electromagnetic actuators 138 and 140 are used to eliminate rotor displacements in the z-axis.

Figure 2:
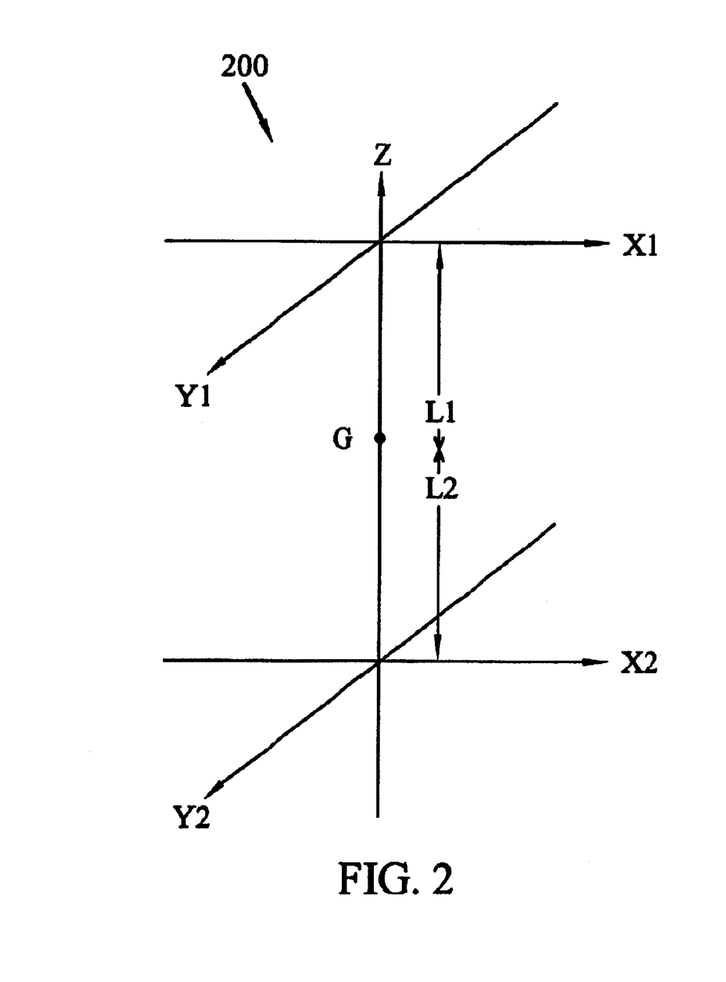
FIG. 2 illustrates an exemplary sensor frame of reference according to an embodiment of the present invention.
Figure 3:
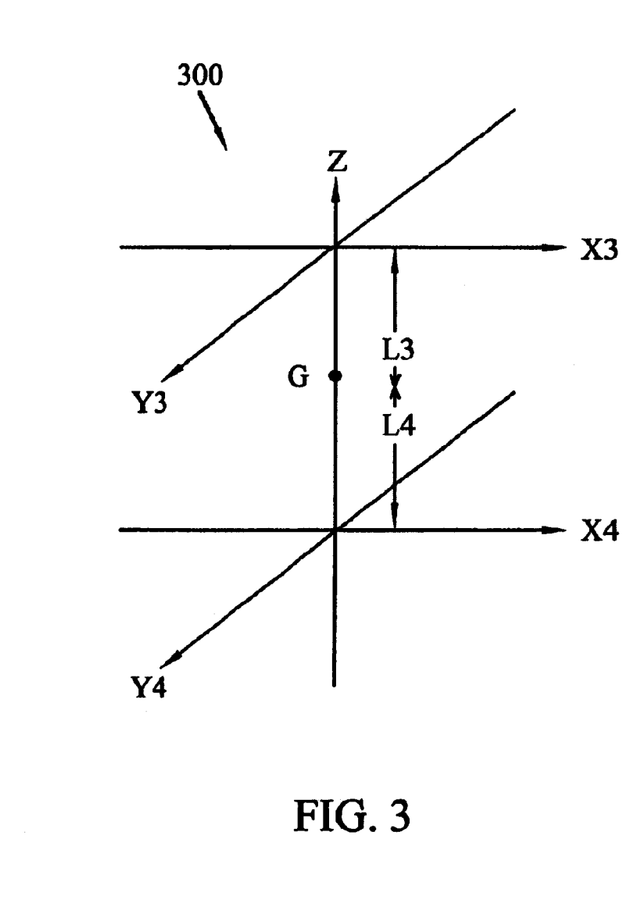
FIG. 3 illustrates an exemplary actuator frame of reference according to an embodiment of the present invention.
Figure 4:
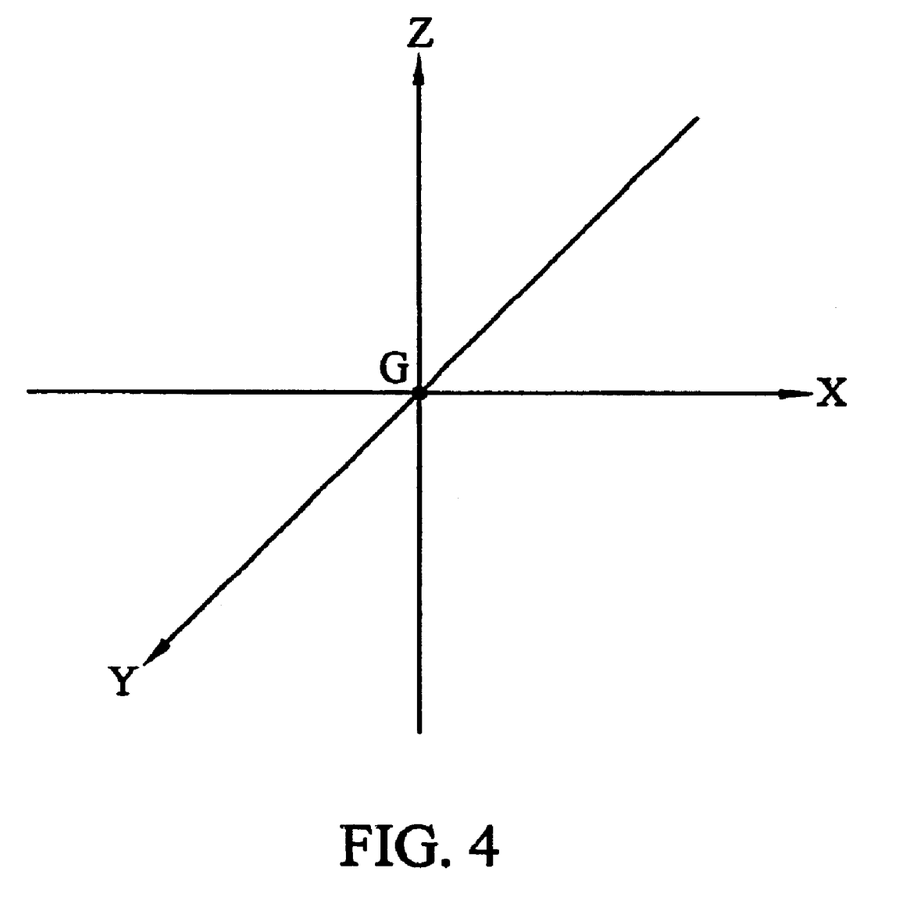
FIG. 4 illustrates an exemplary center of gravity frame of reference according to an embodiment of the present invention.

As is shown more clearly in FIGS. 2 and 3, the first set 112, 114 and the second set 116, 118 of displacement sensors sense radial rotor displacements in a sensor frame of reference 200, and the electromagnetic actuators 122–136 effect radial movements in an actuator frame of reference 300. That is, the radial displacements are sensed, and the radial movements are effected, along control axes that are displaced from the rotor center of gravity G. More specifically, the sensor frame of reference 200 includes two sets of perpendicular control axes, a first set X1 and Y1, and a second set X2 and Y2, which are each perpendicular to the axis of rotation R (e.g., the z-axis) and displaced from the rotor center of gravity G by predetermined distances, denoted as $L_1$ and $L_2$. Similarly, the actuator frame of reference 300 includes two sets of perpendicular control axes, a first set X3 and Y3, and a second set X4 and Y4, which are also each perpendicular to the axis of rotation R (e.g., the z-axis) and displaced from the rotor center of gravity G by predetermined distances, denoted as $L_3$ and $L_4$. As FIGS. 2 and 3 further illustrate, a fifth control axis Z passes through the center of gravity G and is collocated with the axis of rotation R. Thus, radial rotor displacements are sensed along the X1, X2, Y1, and Y2 control axes in the sensor frame of reference 200, and radial rotor displacements are effected along the X3, X4, Y3, Y4 control axes in the actuator frame of reference 300. It will be appreciated that if the radial displacement sensors 112–118 and the radial actuators 122–136 are substantially collocated, then the sensor frame of reference 200 and the actuator frame of reference 300 will be the same. As will be discussed in more detail below, the displacements sensed in the sensor frame of reference 200, and displacements effected in the actuator frame of reference 300, are transformed to a center of gravity frame of reference 400. The center of gravity frame of reference 400 is depicted in FIG. 4 and, as its name implies, has its origin at the rotor's 102 center of gravity G.

As was alluded to above, when the rotor 102 rotates at relatively high speeds, it may experience gyroscopic effects. When this occurs, gyroscopic coupling exists between the two rotational axes, which are the Ψ-axis and the θ-axis. Because the magnitude of the gyroscopic effects increases with speed, this gyroscopic coupling also changes with speed. Thus, the controller 110, which will now be discussed in more detail, is designed to accommodate this ever-changing gyroscopic influence in a continuous manner.

Figure 5:
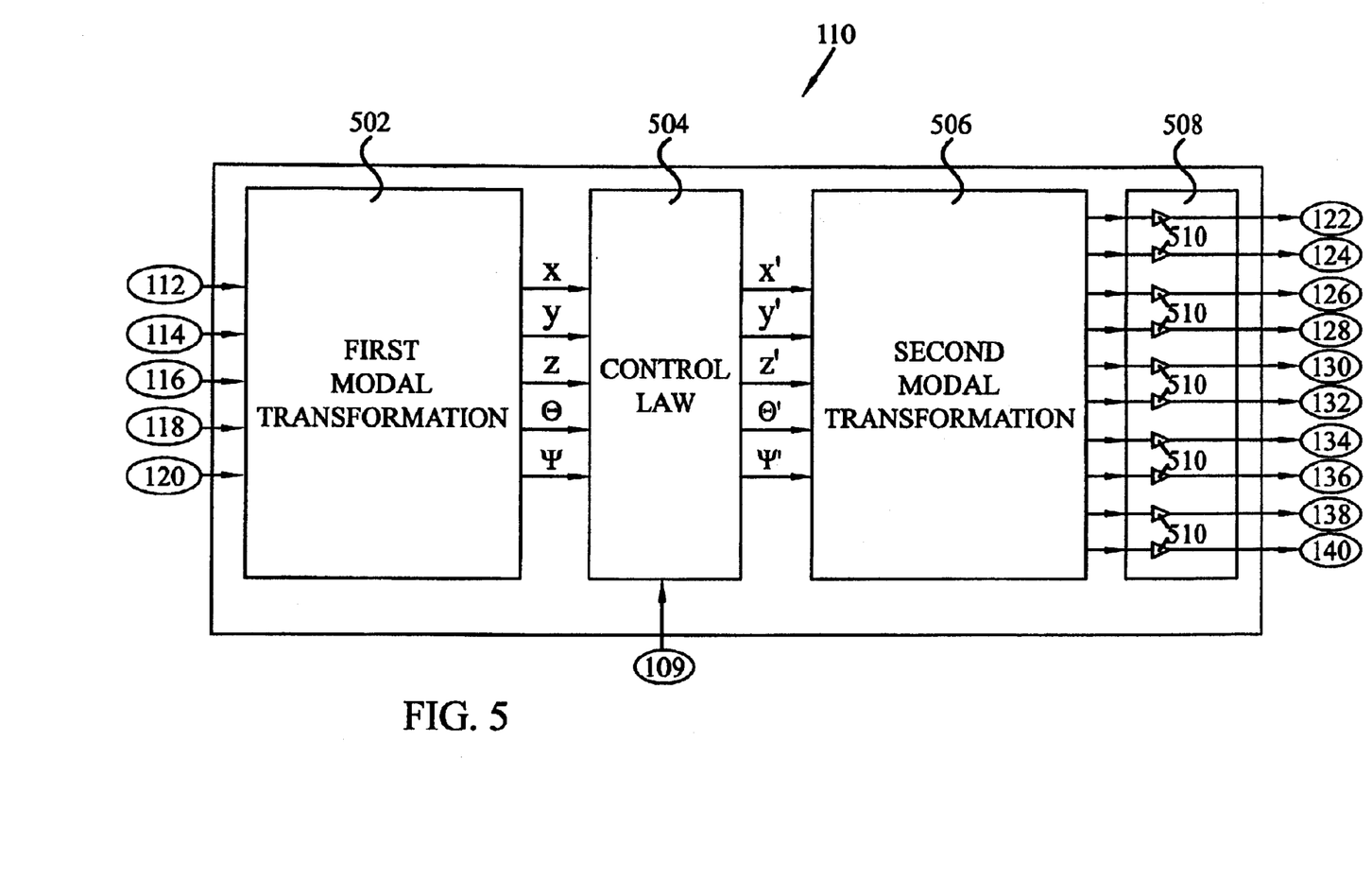
FIG. 5 depicts a block diagram of a controller according to an embodiment of the present invention.

The controller 110, which is depicted in block diagram form in FIG. 5, includes a first modal transformation circuit portion 502, a control law circuit portion 504, a second modal transformation circuit portion 506, and an amplifier circuit portion 508. It will be appreciated that these circuit portions may be implemented individually or as part of a single circuit device. Moreover, it will be appreciated that these circuit portions may be implemented as discrete components or as integrated circuits. In a preferred embodiment, however, the first modal transformation circuit portion 502, the control law circuit portion 504, and the second modal transformation circuit portion 506 are implemented in a single, software-controlled digital signal processor (DSP). Each of these separate circuit portions and the functions each performs will now be more fully described.

The first modal transformation circuit portion 502 implements a modal transformation that converts the displacement sensor 112–120 signals from coordinates in the sensor frame of reference 200 to coordinates in the center of gravity frame of reference 400. This modal transformation is carried out according to the following matrix equation, where the subscripts in the S-matrix correlate to the reference numerals of the displacement sensors 112–120:

$$\begin{bmatrix} X \\ Y \\ Z \\ \varphi \\ \theta \end{bmatrix} = \begin{bmatrix} \frac{L_2}{L_1+L_2} & 0 & \frac{L_1}{L_1+L_2} & 0 & 0 \\ 0 & \frac{L_2}{L_1+L_2} & 0 & \frac{L_1}{L_1+L_2} & 0 \\ 0 & 0 & 0 & 0 & 1 \\ 0 & \frac{1}{L_1+L_2} & 0 & \frac{-1}{L_1+L_2} & 0 \\ \frac{-1}{L_1+L_2} & 0 & \frac{1}{L_1+L_2} & 0 & 0 \end{bmatrix} \begin{bmatrix} S_{112} \\ S_{116} \\ S_{114} \\ S_{118} \\ S_{120} \end{bmatrix}$$

The modal transformation carried out by the first modal transformation circuit portion 502 removes the adverse effects of non-symmetric geometry and non-collocation of the displacement sensors 112–120 and actuators 122–140, and decouples the x-, y-, z-, Ψ-, and θ-axes from one another. Thus, the x-, y-, and z-axes can be controlled independently and the Ψ-, and θ-axes can be controlled with straight-forward coupling.

Figure 6:
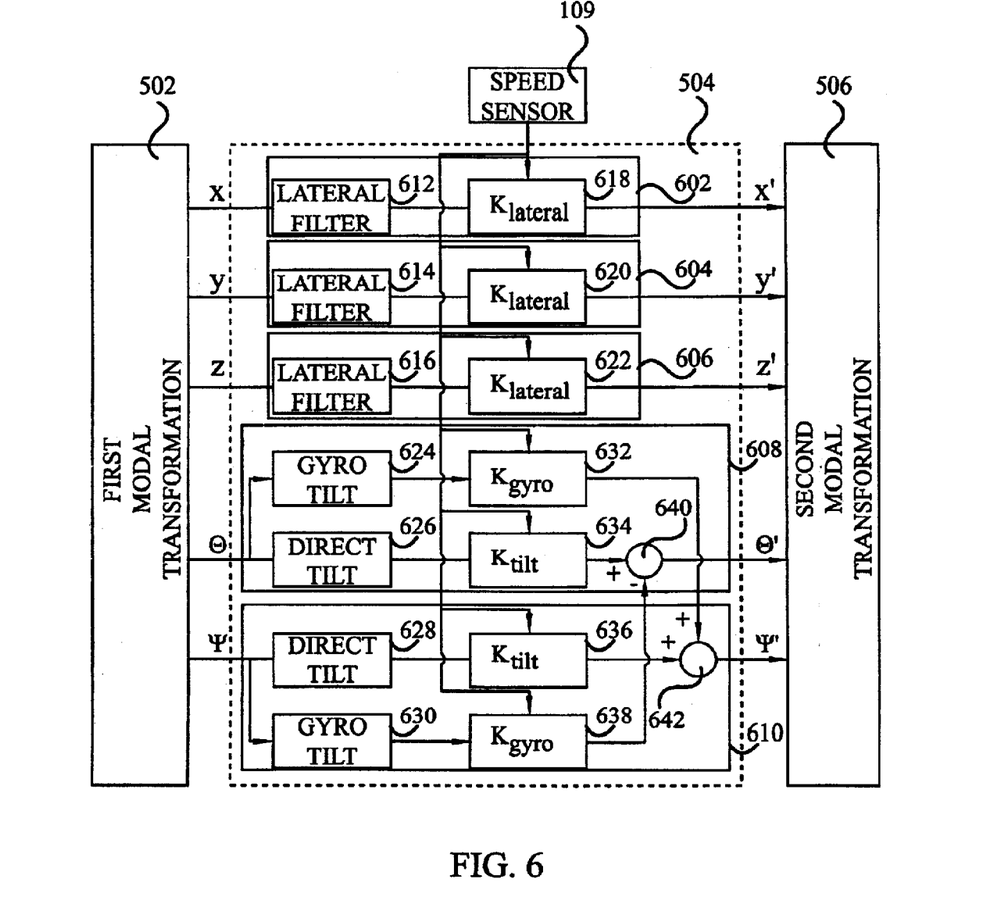
FIG. 6 depicts a block diagram of a control law circuit portion of the controller depicted in FIG. 5.

The control law circuit portion 504 receives the transformed displacement signals from the first modal transformation circuit portion 502 and a signal representative of the rotor's 102 speed of rotation from the speed sensor 109, and generates appropriate correction signals. In particular, as depicted in FIG. 6, the control law circuit portion 504 includes five separate control channels 602–610, one for each degree-of-freedom. Thus, the control law circuit portion 504 includes an X control channel, a Y control channel, a Z control channel, psi (Ψ) control channel, and a theta (θ) control channel, each of which will now be described in more detail.

The X, Y, and Z control channels 602–606 each implement a control law that consists of a multi-order filter 612–616 that possesses proportional-plus-integral-plus-derivative (PID) properties, and a speed-independent steady-state gain 618–620 ($K_{lateral}$). The psi (Ψ) and theta (θ) control channels 608, 610 each implement two control laws that consist of multi-order PID filters and variable speed-dependent steady-state gains. Specifically, the two control laws in the psi (Ψ) and theta (θ) control channels 608, 610 include a direct-tilt control law 624, 628 and associated variable steady-state gain ($K_{tilt}$) 634, 636 and a gyro-tilt control law 624, 630 and associated variable steady-state gain ($K_{gyro}$) 632, 638. The direct-tilt control laws 626, 628 address zero-speed, or non-gyroscopic behavior of the rotor 102, and the gyro-tilt control laws 624, 630 address non-zero-speed, or gyroscopic behavior of the rotor 102. The psi (Ψ) and theta (θ) control channels 608, 610 also each include a summing circuit 640, 642. In the theta (θ) control channel 608, the summing circuit 640 subtracts the psi (Ψ) control channel variable gyro-tilt gain ($K_{gyro}$) 638 from the theta (θ) control channel variable direct tilt gain ($K_{tilt}$) 634. Conversely, in the psi (Ψ) control channel 610, the summing circuit 642 adds the theta (θ) control channel variable gyro-tilt gain ($K_{gyro}$) 632 to the psi (Ψ) control channel variable direct tilt gain ($K_{tilt}$) 636.

Figure 7:
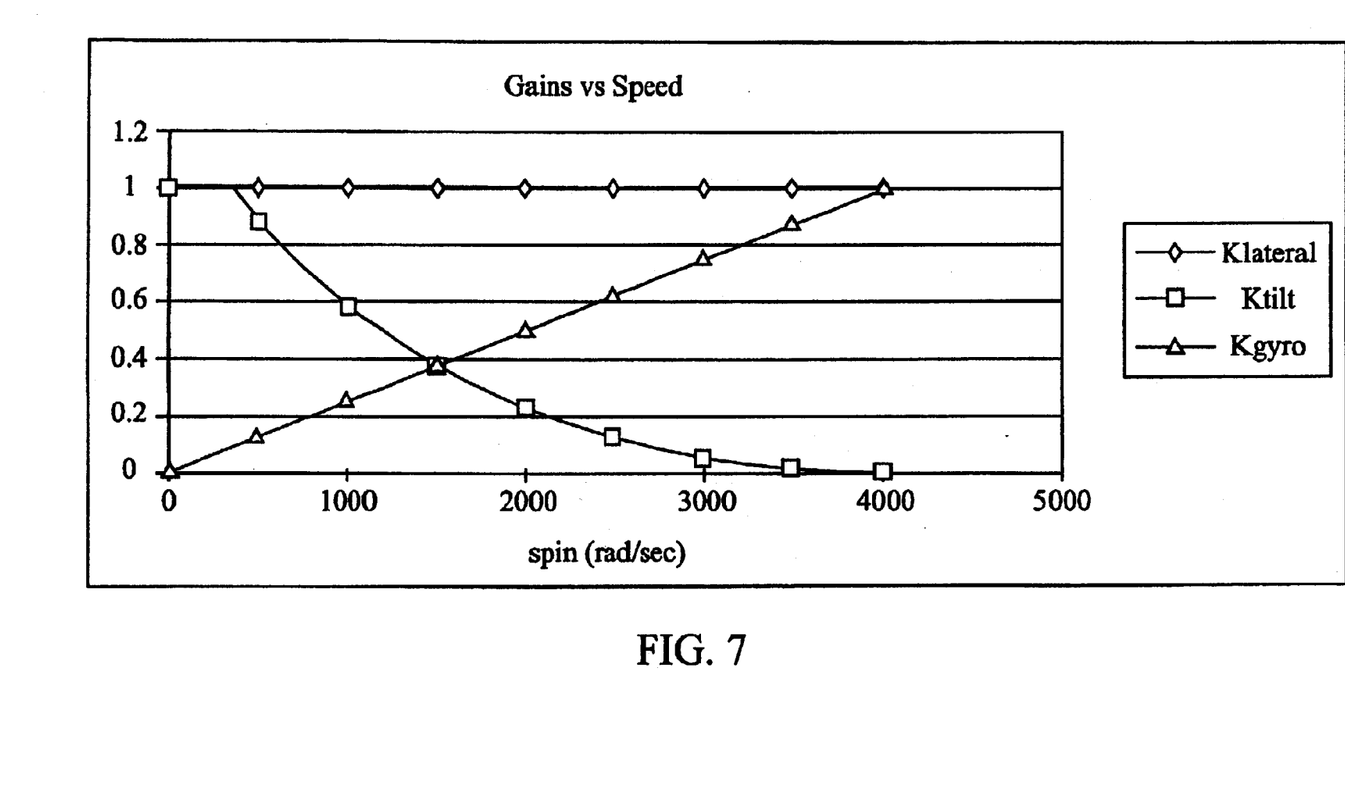
FIG. 7 is a graph depicting how the various steady-state gains in the control law circuit of FIG. 6 vary with the rotational speed of the rotor.

The speed dependent steady-state gains, as their names imply, may vary with the rotational speed of the rotor 102. Thus, the rotational speed sensor 109 supplies a signal representative of the rotor's rotational speed to controller 110, and specifically to each of the speed dependent steady state gains. With reference now to FIG. 7, it can be seen how the various steady-state gains ($K_{lateral}$, $K_{tilt}$, $K_{gyro}$) are continuously varied with rotor speed. In the depicted embodiment, the lateral steady-state gains ($K_{lateral}$) remain constant relative to rotor speed, while the direct-tilt gains ($K_{tilt}$) decrease with rotor speed and the gyro-tilt gains ($K_{gyro}$) increase with rotor speed. Moreover, as can be seen, the direct-tilt gains ($K_{tilt}$) decrease non-linearly with speed and the gyro-tilt gains ($K_{gyro}$) increase linearly with speed. Thus, the overall gains in the X, Y, and Z channels remain constant with rotor speed, while the overall gains in the theta and psi channels vary in a continuous, non-linear manner as the rotor's speed of rotation varies. It will be appreciated that these gain changes could be implemented in any one of numerous ways including, but not limited to, using a simple equation or using a look-up table.

The second modal transformation circuit portion 506 receives the correction signals from the control law circuit portion 504 and implements a modal transformation that converts the correction signals from coordinates in the center of gravity frame of reference 400 to coordinates in the actuator frame of reference 300. This modal transformation is carried out according to the following matrix equation, where the subscripts in the A-matrix correlate to the reference numerals of the actuators 122–140:

$$\begin{bmatrix} A_{122} \\ A_{124} \\ A_{126} \\ A_{128} \\ A_{130} \\ A_{132} \\ A_{134} \\ A_{136} \\ A_{138} \\ A_{140} \end{bmatrix} = \begin{bmatrix} -1 & 0 & 0 & L_3 & 0 \\ 1 & 0 & 0 & -L_3 & 0 \\ 0 & -1 & 0 & 0 & -L_3 \\ 0 & 1 & 0 & 0 & L_3 \\ -1 & 0 & 0 & -L_4 & 0 \\ 1 & 0 & 0 & L_4 & 0 \\ 0 & -1 & 0 & 0 & L_4 \\ 0 & 1 & 0 & 0 & -L_4 \\ 0 & 0 & -1 & 0 & 0 \\ 0 & 0 & 1 & 0 & 0 \end{bmatrix} \begin{bmatrix} X \\ Y \\ Z \\ \theta \\ \varphi \end{bmatrix}$$

The correction signals in the actuator frame of reference 300 are supplied to the amplifier circuit portion 508. The amplifier circuit portion 508 includes an amplifier 510 for each actuator 122–140, each of which amplifies its associated correction signal and supplies the amplified correction signal to its associated actuator 122–140.

As was noted above, the magnetic bearing control system and method is not limited to use with independent radial and axial bearing assemblies, and may also be used with various other types of magnetic bearing assembly configurations including, but not limited to, conical bearings, and combination bearings. It will additionally be appreciated that the present invention may be used with both homopolar and heteropolar configurations, and with both current biased and permanent magnet biased bearing configurations. Moreover, the skilled artisan will appreciate that the number of control channels may be reduced from the above-described ten channels to five channels, if the permanent magnet biased homopolar configuration is used.

When the system and method are used with conical magnetic bearing assemblies, then only eight actuators are used and the cone angle ($\alpha$) is taken into account by the modal transformation that converts the correction signals from coordinates in the center of gravity frame of reference 400 to coordinates in the actuator frame of reference 300. In this case, the modal transformation is carried out according to the following matrix equation:

$$\begin{bmatrix} A_{122} \\ A_{124} \\ A_{126} \\ A_{128} \\ A_{130} \\ A_{132} \\ A_{134} \\ A_{136} \end{bmatrix} = \begin{bmatrix} -\frac{1}{\cos\alpha} & 0 & -\frac{1}{\sin\alpha} & \frac{L_3}{\cos\alpha} & 0 \\ \frac{1}{\cos\alpha} & 0 & -\frac{1}{\sin\alpha} & -\frac{L_3}{\cos\alpha} & 0 \\ 0 & -\frac{1}{\cos\alpha} & -\frac{1}{\sin\alpha} & 0 & -\frac{L_3}{\cos\alpha} \\ 0 & \frac{1}{\cos\alpha} & -\frac{1}{\sin\alpha} & 0 & \frac{L_3}{\cos\alpha} \\ -\frac{1}{\cos\alpha} & 0 & \frac{1}{\sin\alpha} & -\frac{L_4}{\cos\alpha} & 0 \\ \frac{1}{\cos\alpha} & 0 & \frac{1}{\sin\alpha} & \frac{L_4}{\cos\alpha} & 0 \\ 0 & -\frac{1}{\cos\alpha} & \frac{1}{\sin\alpha} & 0 & \frac{L_4}{\cos\alpha} \\ 0 & \frac{1}{\cos\alpha} & \frac{1}{\sin\alpha} & 0 & -\frac{L_4}{\cos\alpha} \end{bmatrix} \begin{bmatrix} X \\ Y \\ Z \\ \theta \\ \varphi \end{bmatrix}$$

It will be appreciated that the present invention may be used with the various known types of magnetic bearing and actuator configurations including, but not limited to, combination bearings, conical bearings, and independent radial and axial bearings. It will additionally be appreciated that the present invention may be used with both homopolar and heteropolar configurations, and with both current biased and permanent magnet biased bearing configurations. The skilled artisan will appreciate that if the permanent magnet biased homopolar configuration is used, that the number of control channels may be reduced from ten channels to five channels.

Figure 8:
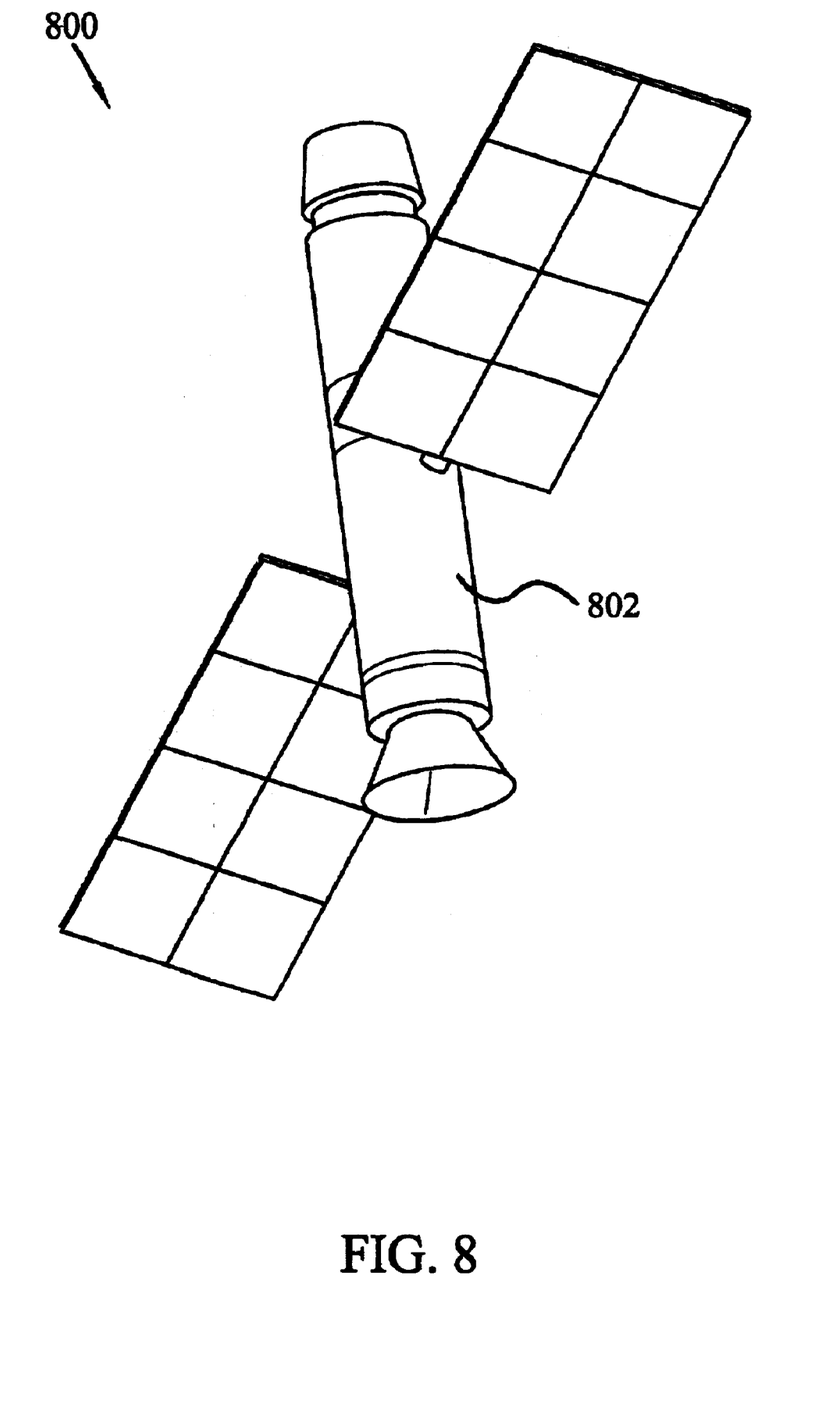
FIG. 8 is a perspective view of a satellite that incorporates, and/or includes one or more components that incorporate, the active magnetic bearing system depicted in FIG. 1.

It will be further appreciated that one of the end uses for the active magnetic bearing system 100 described herein is in space applications, such as the satellite 800 depicted in FIG. 8. The satellite 800 includes a housing 802 that incorporates, and/or houses components that include, one or more of the previously described active magnetic bearing systems 100.

The present invention provides a system and method for controlling an active magnetic bearing assembly by varying the system control laws in a non-linear fashion as a function of rotor rotational speed. The system control law variation is carried out in a continuous and optimal manner over the operating speed range of the rotor, and the control method is not computationally intensive.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An active magnetic bearing system for rotationally suspending a rotor having a center of gravity, comprising:
   at least two displacement sensors, each displacement sensor operable to (i) sense rotor displacements in a sensor frame of reference that is displaced from the rotor center of gravity and (ii) supply displacement signals representative thereof;
   a rotational speed sensor operable to sense a rotational speed of the rotor and supply a rotational speed signal;

a controller coupled to receive the displacement signals from each of the displacement sensors and the rotational speed signal from the rotational speed sensor, and operable in response thereto to:
  (i) transform the displacement signals from the sensor frame of reference to a center of gravity frame of reference,
  (ii) generate correction signals according to predetermined gains to eliminate first and second linear displacements of the rotor's center of gravity and first and second rotational displacements around the rotor's center of gravity,
  (iii) vary the predetermined gains of at least the correction signals generated to eliminate the rotational displacements in a continuous non-linear fashion based on the received rotational speed signal, and
  (iv) transform the correction signals to an actuator frame of reference that is displaced from the rotor center of gravity;
and
  at least two electromagnetic actuators coupled to receive the transformed correction signals and operable, in response thereto, to eliminate the sensed rotor displacements.

2. The system of claim 1, further comprising:
  an amplifier circuit portion coupled to receive the transformed correction signals and operable to amplify the transformed correction signals and supply the amplified transformed correction signals to the electromagnetic actuators.

3. The system of claim 1, wherein the sensor frame of reference and the actuator frame of reference are collocated.

4. The system of claim 1, wherein the predetermined gains of the first and second linear displacement correction signals remain substantially constant as the rotational speed of the rotor varies.

5. The system of claim 1, wherein the controller comprises:
  a first coordinate transformation circuit operable to transform the received displacement signals from the sensor frame of reference to the center of gravity frame of reference, the transformed displacement signals in the center of gravity frame of reference including signals representative of at least the first and second linear displacements of the rotor's center of gravity and the first and second rotational displacements of the rotor around the rotor center of gravity.

6. The system of claim 5, wherein the controller further comprises:
  a first linear control channel coupled to receive the signals representative of the first linear displacement from the first coordinate transformation circuit and operable to generate a first linear correction signal to eliminate the first linear displacement;
  a second linear control channel coupled to receive the signal representative of the second linear displacement from the first coordinate transformation circuit and operable to generate a second linear correction signal to eliminate the second linear displacement;
  a first rotational control channel coupled to receive the signal representative of the first rotational displacement from the first coordinate transformation circuit and operable to generate a first rotational correction signal to eliminate the first rotational displacement; and
  a second rotational control channel coupled to receive the signal representative of the second rotational displacement from the first coordinate transformation circuit and operable to generate a second rotational correction signal to eliminate the second rotational displacement.

7. The system of claim 6, wherein the signals representative of the first and second rotational displacements each include a non-gyroscopic signal component and a gyroscopic signal component, and wherein the first and second rotational control channels each comprise:
  a first filter circuit operable to filter the non-gyroscopic signal component from the first rotational displacement signal;
  a first variable gain circuit coupled to receive the rotational speed signal and operable, in response thereto, to apply a first speed-dependent variable gain to the filtered non-gyroscopic signal component to produce a non-gyroscopic correction signal;
  a second filter circuit operable to filter the gyroscopic signal component from the first rotational displacement signal; and
  a second variable gain circuit coupled to receive the rotational speed signal and operable, in response thereto, to apply a second speed-dependent variable gain to the filtered gyroscopic signal component to produce a gyroscopic correction signal.

8. The system of claim 7, further comprising:
  a first summing circuit coupled to receive the non-gyroscopic correction signal from the first rotational control channel and the gyroscopic correction signal from the second rotational control channel and operable to combine the two signals and supply the correction signal to eliminate the first rotational displacement around the rotor's center of gravity based on the combination; and
  a second summing circuit coupled to receive the non-gyroscopic correction signal from the second rotational control channel and the gyroscopic correction signal from the first rotational control channel and operable to combine the two signals and supply the correction signal to eliminate the second rotational displacement around the rotor's center of gravity based on the combination.

9. The system of claim 8, wherein:
  the first speed-dependent variable gain decreases substantially non-linearly as the rotational speed of the rotor increases; and
  the second speed dependent variable gain increases substantially linearly as the rotational speed of the rotor increases.

10. The system of claim 1, wherein the displacement sensors comprise:
  one or more first displacement sensors each operable to sense rotor displacements along a first axis; and
  one or more second displacement sensors each operable to sense rotor displacements along a second axis that is perpendicular to the first axis.

11. The system of claim 10, further comprising:
  one or more third displacement sensors each operable to sense rotor displacements along a third axis that is perpendicular to the first and second axes.

12. The system of claim 11, wherein the controller is further operable to generate correction signals to eliminate a third linear displacement of the rotor's center of gravity.

13. The system of claim 12, wherein the first, second, and third linear displacements are perpendicular to one another.

14. The system of claim 1, wherein the electromagnetic actuators comprise:

one or more first actuators each operable to eliminate rotor displacements along a first axis; and one or more second actuators each operable to eliminate rotor displacements along a second axis that is perpendicular to the first axis.

15. The system of claim 14, wherein the controller is further operable to generate correction signals to eliminate a third linear displacement of the rotor's center of gravity.

16. The system of claim 15, further comprising:

one or more third actuators each operable to eliminate rotor displacements along a third axis that is perpendicular to the first and second axes.

17. An active magnetic bearing system for rotationally suspending a rotor having a center of gravity, comprising:

at least two displacement sensors, each displacement sensor operable to (i) sense rotor displacements in a sensor frame of reference that is displaced from the rotor center of gravity and (ii) supply displacement signals representative thereof;

a rotational speed sensor operable to sense a rotational speed of the rotor and supply a rotational speed signal;

a first coordinate transformation circuit operable to transform the received displacement signals from the sensor frame of reference to a center of gravity frame of reference, the transformed displacement signals in the center of gravity frame of reference including signals representative of at least the first and second linear displacements of the rotor's center of gravity and the first and second rotational displacements of the rotor around the rotor center of gravity;

a first linear control channel coupled to receive the signals representative of the first linear displacement from the first coordinate transformation circuit and operable to generate a first linear correction signal to eliminate the first linear displacement;

a second linear control channel coupled to receive the signal representative of the second linear displacement from the first coordinate transformation circuit and operable to generate a second linear correction signal to eliminate the second linear displacement;

a first rotational control channel coupled to receive the signal representative of the first rotational displacement from the first coordinate transformation circuit and operable to generate a first rotational correction signal to eliminate the first rotational displacement;

a second rotational control channel coupled to receive the signal representative of the second rotational displacement from the first coordinate transformation circuit and operable to generate a second rotational correction signal to eliminate the second rotational displacement;

a second coordinate transformation circuit coupled to receive the first and second linear correction signals and the first and second rotational correction signals and operable to transform the received correction signals from the center of gravity coordinates to actuator coordinates; and at least two electromagnetic actuators coupled to receive the transformed correction signals and operable, in response thereto, to eliminate the sensed rotor displacements.

18. The system of claim 17, wherein the signals representative of the first and second rotational displacements each include a non-gyroscopic signal component and a gyroscopic signal component, and wherein the first and second rotational control channels each comprise:

a first filter circuit operable to filter the non-gyroscopic signal component from the first rotational displacement signal;

a first variable gain circuit coupled to receive the rotational speed signal and operable, in response thereto, to apply a first speed-dependent variable gain to the filtered non-gyroscopic signal component to produce a non-gyroscopic correction signal;

a second filter circuit operable to filter the gyroscopic signal component from the first rotational displacement signal; and a second variable gain circuit coupled to receive the rotational speed signal and operable, in response thereto, to apply a second speed-dependent variable gain to the filtered gyroscopic signal component to produce a gyroscopic correction signal.

19. The system of claim 18, further comprising:

a first summing circuit coupled to receive the non-gyroscopic correction signal from the first rotational control channel and the gyroscopic correction signal from the second rotational control channel and operable to combine the two signals and supply the correction signal to eliminate the first rotational displacement around the rotor's center of gravity based on the combination; and a second summing circuit coupled to receive the non-gyroscopic correction signal from the second rotational control channel and the gyroscopic correction signal from the first rotational control channel and operable to combine the two signals and supply the correction signal to eliminate the second rotational displacement around the rotor's center of gravity based on the combination.

20. The system of claim 19, wherein:

the first speed-dependent variable gain decreases substantially non-linearly as the rotational speed of the rotor increases; and the second speed dependent variable gain increases substantially linearly as the rotational speed of the rotor increases.

21. The system of claim 17, wherein the displacement sensors comprise:

one or more first displacement sensors each operable to sense rotor displacements along a first axis; and one or more second displacement sensors each operable to sense rotor displacements along a second axis that is perpendicular to the first axis.

22. The system of claim 21, further comprising:

one or more third displacement sensors each operable to sense rotor displacements along a third axis that is perpendicular to the first and second axes.

23. The system of claim 22, wherein the controller is further operable to generate correction signals to eliminate a third linear displacement of the rotor's center of gravity.

24. The system of claim 23, wherein the first, second, and third linear displacements are perpendicular to one another.

25. The system of claim 19, wherein the electromagnetic actuators comprise:

one or more first actuators each operable to eliminate rotor displacements along a first axis; and one or more second actuators each operable to eliminate rotor displacements along a second axis that is perpendicular to the first axis.

26. The system of claim 25, wherein the controller is further operable to generate correction signals to eliminate a third linear displacement of the rotor's center of gravity.

27. The system of claim 26, further comprising:
one or more third actuators each operable to eliminate rotor displacements along a third axis that is perpendicular to the first and second axes.

28. The system of claim 19, further comprising:
an amplifier circuit portion coupled to receive the transformed correction signals and operable to amplify the transformed correction signals and supply the amplified transformed correction signals to the electromagnetic actuators.

29. The system of claim 19, wherein the sensor frame of reference and the actuator frame of reference are collocated.

30. The system of claim 19, wherein the predetermined gains of the first and second linear displacement correction signals remain substantially constant as the rotational speed of the rotor varies.

31. In a system including at least a rotor having a center of gravity, and an active magnetic bearing system having a plurality of displacement sensors each sensing rotor displacements according to sensor coordinates, and a plurality of actuators each operable to eliminate the rotor displacements according to actuator coordinates, the sensor and actuator coordinates each having a frame of reference displaced from the rotor center of gravity, a method of controlling the active magnetic bearing system to substantially eliminate the rotor displacements, comprising:
transforming the sensed rotor displacements from the sensor coordinates to center of gravity coordinates, the center of gravity coordinates having the rotor's center of gravity as a frame of reference and including at least first and second linear displacements of the rotor center of gravity and first and second rotational displacements of the rotor around the rotor center of gravity;
generating correction signals according to predetermined gains to eliminate the first and second linear displacements and the first and second rotational displacements;
varying the predetermined gains of the first and second rotational displacement correction signals in a continuous non-linear fashion based on a determined rotational speed of the rotor;
transforming the generated correction signals from the center of gravity coordinates to the actuator coordinates; and
eliminating the sensed rotor displacements using the transformed correction signals.

32. The method of claim 31, further comprising:
amplifying the transformed correction signals prior to eliminating the rotor displacements.

33. The method of claim 31, wherein the sensor frame of reference and the actuator frame of reference are collocated.

34. The method of claim 31, wherein the predetermined gains of the first and second linear displacement correction signals remain substantially constant as the rotational speed of the rotor varies.

35. The method of claim 31, wherein the center of gravity coordinates further include a third linear displacement of the rotor center of gravity.

36. The method of claim 31, wherein the first and second rotational displacements of the rotor around the center of gravity each include a non-gyroscopic component and a gyroscopic component.

37. The method of claim 36, wherein the step of generating correction signals to eliminate the first and second rotational displacements comprises:
generating a first non-gyroscopic correction signal according to a first predetermined non-gyroscopic gain;
generating a first gyroscopic correction signal according to a first predetermined gyroscopic gain;
generating a second non-gyroscopic correction signal according to a second predetermined non-gyroscopic gain; and
generating a second gyroscopic correction signal according to a second predetermined gyroscopic gain.

38. The method of claim 37, further comprising:
combining the first non-gyroscopic correction signal and the second gyroscopic correction signal to produce the correction signal to eliminate the first rotational displacement of the rotor around the rotor center of gravity; and
combining the second non-gyroscopic correction signal and the first gyroscopic correction signal to produce the correction signal to eliminate the second rotational displacement of the rotor around the rotor center of gravity.

39. The method of claim 37, wherein:
the first and second predetermined non-gyroscopic gains decrease substantially non-linearly as the rotational speed of the rotor increases; and
the first and second predetermined gyroscopic gains increase substantially linearly as the rotational speed of the rotor increases.

40. In a system including at least a rotor having a center of gravity and an axis of rotation, a method of controlling an active magnetic bearing system to substantially eliminate lateral displacement of the rotor center of gravity from a predetermined position and a rotation of the rotor around the rotor center of gravity, the method comprising
determining a rotor displacement along a first set of control axes that are perpendicular to the axis of rotation and have origins displaced from the rotor center of gravity a predetermined distance in a first direction;
determining a rotor displacement along a second set of control axes that are perpendicular to the axis of rotation and have origins displaced from the rotor center of gravity the predetermined distance in a second direction;
transforming the determined rotor displacements from coordinates along the first and second sets of control axes to center of gravity coordinates, the center of gravity coordinates having an origin at the rotor center of gravity, and including at least first and second linear displacements of the rotor center of gravity and first and second rotational displacements of the rotor around the rotor center of gravity;
determining a rotational speed of the rotor around the axis of rotation;
generating correction signals according to predetermined gains to eliminate the first and second linear displacements and first and second rotational displacements;
varying the predetermined gains of the first and second rotational correctional signals in a non-linear fashion based on the determined rotational speed of the rotor;
transforming the generated correction signals from the rotor center of gravity coordinates to coordinates along third and fourth sets of control axes; and
eliminating the rotor displacements along the third and fourth sets of control axes using the transformed correction signals.

41. The method of claim 40, further comprising:
amplifying the transformed correction signals prior to eliminating the rotor displacements.

42. The method of claim 40, wherein the first and third sets of control axes, and the second and fourth sets of control axes, respectively, are collocated.

43. The method of claim 40, wherein the predetermined gains of the first and second linear displacement correction signals remain substantially constant as the rotational speed of the rotor varies.

44. The method of claim 40, wherein the center of gravity coordinates further include a third linear displacement of the rotor center of gravity.

45. The method of claim 40, wherein the first and second rotational displacements of the rotor around the center of gravity each include a non-gyroscopic component and a gyroscopic component.

46. The method of claim 45, wherein the step of generating correction signals to eliminate the first and second rotational displacements comprises:
   generating a first non-gyroscopic correction signal according to a first predetermined non-gyroscopic gain;
   generating a first gyroscopic correction signal according to a first predetermined gyroscopic gain;
   generating a second non-gyroscopic correction signal according to a second predetermined non-gyroscopic gain; and
   generating a second gyroscopic correction signal according to a second predetermined gyroscopic gain.

47. The method of claim 46, further comprising:
   combining the first non-gyroscopic correction signal and the second gyroscopic correction signal to produce the correction signal to eliminate the first rotational displacement of the rotor around the rotor center of gravity; and
   combining the second non-gyroscopic correction signal and the first gyroscopic correction signal to produce the correction signal to eliminate the second rotational displacement of the rotor around the rotor center of gravity.

48. The method of claim 46, wherein:
   the first and second predetermined non-gyroscopic gains decrease substantially non-linearly as the rotational speed of the rotor increases; and
   the first and second predetermined gyroscopic gains increase substantially linearly as the rotational speed of the rotor increases.

49. A method of generating control signals for controlling an active magnetic bearing system to substantially eliminate lateral displacement of a rotor center of gravity from a predetermined position and a rotation of the rotor around the center of gravity, the method comprising:
   transforming sensed rotor displacements from sensor coordinates having a frame of reference displaced from the rotor center of gravity to center of gravity coordinates having the rotor center of gravity as a frame of reference, the center of gravity coordinates including at least first and second linear displacements of the rotor center of gravity and first and second rotational displacements of the rotor around the rotor center of gravity;
   generating correction signals according to predetermined gains for eliminating the first and second linear displacements and first and second rotational displacements; and
   varying the predetermined gains of the first and second rotational correction signals in a continuous non-linear fashion based on a determined rotational speed of the rotor.

50. The method of claim 49, further comprising:
   transforming the generated correction signals from the center of gravity coordinates to actuator coordinates, the actuator coordinates having a frame of reference displaced from the rotor center of gravity.

51. The method of claim 49, further comprising:
   amplifying the transformed correction signals.

52. The method of claim 49, wherein the sensor frame of reference and the actuator frame of reference are collocated.

53. The method of claim 49, wherein the predetermined gains of the first and second linear displacement correction signals remain substantially constant as the rotational speed of the rotor varies.

54. The method of claim 49, wherein the center of gravity coordinates further include a third linear displacement of the rotor center of gravity.

55. The method of claim 49, wherein the first and second rotational displacements of the rotor around the center of gravity each include a non-gyroscopic component and a gyroscopic component.

56. The method of claim 55, wherein the step of generating correction signals to eliminate the first and second rotational displacements comprises:
   generating a first non-gyroscopic correction signal according to a first predetermined non-gyroscopic gain;
   generating a first gyroscopic correction signal according to a first predetermined gyroscopic gain;
   generating a second non-gyroscopic correction signal according to a second predetermined non-gyroscopic gain; and
   generating a second gyroscopic correction signal according to a second predetermined gyroscopic gain.

57. The method of claim 56, further comprising:
   combining the first non-gyroscopic correction signal and the second gyroscopic correction signal to produce the correction signal to eliminate the first rotational displacement of the rotor around the rotor center of gravity; and
   combining the second non-gyroscopic correction signal and the first gyroscopic correction signal to produce the correction signal to eliminate the second rotational displacement of the rotor around the rotor center of gravity.

58. The method of claim 56, wherein:
   the first and second predetermined non-gyroscopic gains decrease substantially non-linearly as the rotational speed of the rotor increases; and
   the first and second predetermined gyroscopic gains increase substantially linearly as the rotational speed of the rotor increases.

59. A satellite, comprising:
   a housing;
   at least one component having a rotor with a center of gravity, the component being positioned within the housing; and
   an active magnetic bearing system for rotationally suspending the rotor, the active magnetic bearing system including:
      at least two displacement sensors, each displacement sensor operable to (i) sense rotor displacements in a sensor frame of reference that is displaced from the rotor center of gravity and (ii) supply displacement signals representative thereof,
      a rotational speed sensor operable to sense a rotational speed of the rotor and supply a rotational speed signal, a controller coupled to receive the displacement signals from each of the displacement sensors and the rotational speed signal from the rotational speed sensor, and operable in response thereto to:
  (i) transform the displacement signals from the sensor frame of reference to a center of gravity frame of reference,
  (ii) generate correction signals according to predetermined gains to eliminate first and second linear displacements of the rotor's center of gravity and first and second rotational displacements around the rotor's center of gravity,
  (iii) vary the predetermined gains of at least the correction signals generated to eliminate the rotational displacements in a continuous non-linear fashion based on the received rotational speed signal, and
  (iv) transform the correction signals to an actuator frame of reference that is displaced from the rotor center of gravity and
  at least two electromagnetic actuators coupled to receive the transformed correction signals and operable, in response thereto, to eliminate the sensed rotor displacements.

* * * * *